United States Patent
Luscan et al.

(10) Patent No.: US 10,468,873 B2
(45) Date of Patent: Nov. 5, 2019

(54) HIGH VOLTAGE DC CURRENT TRIPOUT DEVICE

(71) Applicant: SUPERGRID INSTITUTE, Villeurbanne (FR)

(72) Inventors: Bruno Luscan, Lyons (FR); Alberto Bertinato, Lyons (FR); Christophe Creusot, Lyons (FR)

(73) Assignee: SUPERGRID INSTITUTE, Villeurbanne (FR)

( * ) Notice: Subject to any disclaimer, the term of this patent is extended or adjusted under 35 U.S.C. 154(b) by 341 days.

(21) Appl. No.: 15/534,692

(22) PCT Filed: Dec. 2, 2015

(86) PCT No.: PCT/FR2015/053299
§ 371 (c)(1),
(2) Date: Jun. 9, 2017

(87) PCT Pub. No.: WO2016/092182
PCT Pub. Date: Jun. 16, 2016

(65) Prior Publication Data
US 2017/0365998 A1      Dec. 21, 2017

(30) Foreign Application Priority Data
Dec. 11, 2014  (FR) ..................... 14 62224

(51) Int. Cl.
*H02H 9/02*     (2006.01)
*H02H 3/087*    (2006.01)
(Continued)

(52) U.S. Cl.
CPC .............. *H02H 9/023* (2013.01); *H01H 9/56* (2013.01); *H01H 33/596* (2013.01); *H02H 3/087* (2013.01)

(58) Field of Classification Search
CPC .......... H02H 9/023; H02H 3/087; H01H 9/56; H01H 33/596
(Continued)

(56) References Cited

U.S. PATENT DOCUMENTS 4,578,730 A * 3/1986 Tokuyama ........... H01H 33/596
307/126
4,618,905 A * 10/1986 Tokuyama ........... H01H 33/596
361/13
(Continued)

FOREIGN PATENT DOCUMENTS

CN  103779828 A  5/2014
EP  0384346      8/1990
EP  0431510      6/1991

OTHER PUBLICATIONS

Bonin V.E. et al., "A Method of Current Interruption in HDVC Networks by Means of AC Circuit-Breakers with Adapted ARC Characteristics and Energy Absorbers," International Conference on Large Electric Systems at High Tension, vol. 1, Aug. 24, 1970 (pp. 1-15).

*Primary Examiner* — Zeev V Kitov
(74) *Attorney, Agent, or Firm* — Occhiuti & Rohlicek LLP

(57) ABSTRACT

A current-breaking device for high-voltage direct current includes a main conduction-line and a secondary conduction-line connected in parallel between its terminals. The main conduction-line comprises a first controlled-switch and a circuit connected in series. The circuit comprises a first current-limiter and a first capacitor connected in parallel. The secondary conduction-line comprises a second controlled-switch. These conduction lines cooperate to form an oscillating circuit that oscillates with an amplitude that is at least equal to limiting current passing through the current limiter.

12 Claims, 6 Drawing Sheets

(51) Int. Cl.
*H01H 9/56* (2006.01)
*H01H 33/59* (2006.01)

(58) Field of Classification Search
USPC .......................................................... 361/93.9
See application file for complete search history.

(56) References Cited

U.S. PATENT DOCUMENTS

| | | | |
|---|---|---|---|
| 5,121,281 A | 6/1992 | Pham et al. | |
| 5,629,658 A * | 5/1997 | Chen | H01H 9/42 |
| | | | 218/4 |
| 2015/0002977 A1* | 1/2015 | Dupraz | H01H 9/542 |
| | | | 361/115 |

* cited by examiner

HIGH VOLTAGE DC CURRENT TRIPOUT DEVICE

RELATED APPLICATIONS

This is the national stage of international application PCT/FR2015/053299, filed on Dec. 2, 2015, which claims the benefit of the Dec. 11, 2014 priority date of French application FR1462224, the contents of which are herein incorporated by reference.

FIELD OF INVENTION

The invention relates to high-voltage direct-current transmission and/or distribution networks, and in particular, to the fault current-breaking devices intended for such networks.

BACKGROUND

High-voltage direct-current ("HVDC") networks are seen as a solution for interconnection of disparate or non-synchronous electricity production sites that have emerged with the development of renewable energies. Such HVDC networks are of particular interest for the transmission and distribution of energy produced by offshore wind-farms. Unlike conventional alternating current technologies, such networks offer lower inline losses and absence of stray network capacitances over long distances. Such networks typically have voltage levels of the order of 50 kV and more.

For point-to-point transmission of electricity, a sectioning may be produced via an end-of-line converter. By contrast, the sectioning can no longer be produced by such a converter in multipoint transmissions. The breaking of the direct current in such networks is a critical issue directly conditioning the feasibility and the development of such networks.

For lower voltage levels, mechanical circuit-breakers break the current by opening. Such a mechanical circuit-breaker generally has two conducting parts that are in mechanical contact when the switch element is closed. Separating these parts breaks the current. These mechanical circuit-breakers have many drawbacks, notably when passed through by high currents.

One drawback arises because the intense electric field between the two conducting parts tends to ionize the air in between. This results in arcing between the two conducting parts when opening the mechanical circuit-breaker. This electrical arc tends to erode the two conducting parts.

Another disadvantage is delay. While the arc exists, current is still flowing. With direct current at high voltage, this arc can be sustained for a not inconsiderable period.

In principle, one could discourage arcing by suitably dimensioning a mechanical circuit-breaker for high direct current voltage applications. However, such a circuit breaker tends to have a long opening delay. This is not so useful when trying to protect the network from, for example, a short circuit.

SUMMARY

The invention aims to resolve one or more of these drawbacks. The invention aims, in particular, to provide an HVDC breaking device that breaks current quickly and that limits conduction losses on the transmission line.

In one aspect, a current-breaking device for high voltage direct current comprises a main conduction-line and a secondary conduction-line connected in parallel between an input terminal and an output terminal. In the main conduction-line, a circuit includes a current limiter and a capacitor connected in parallel. A controlled switch is connected in series with this circuit. When the controlled switch is closed, the main and secondary conduction-lines form an oscillating circuit at the terminals of the switch of the main conduction-line. Current thus oscillates with an amplitude at least equal to the limiting current maintained by the current limiter. The breaking device further comprises a control circuit having a breaking mode of operation. In breaking mode, the control circuit maintains an opening command for the controlled switch of the main conduction-line and a closing command for the controlled switch of the secondary conduction-line.

Upon occurrence of an overcurrent, the potential difference at the terminals of the current limiter increases until the limiting current is reached, after which the current limiter maintains the current passing through it at the limiting current. The capacitor connected in parallel with the current limiter is then charged. Upon closing of the controlled switch of the secondary conduction-line, the oscillating circuit thus formed forces the current passing through the switch of the main conduction-line to pass through a zero value upon the discharging of the capacitor having previously been charged.

With an opening command being maintained on the switch of the main conduction-line, it becomes possible to open this switch when the current passing through it equals zero. This avoids arcing. If, on the cutting off of the electrical arc, the distance between contacts is sufficient, it is possible to definitively break the passage of the current. The dimensioning of this switch in terms of breaking capacity can thus be reduced. Such a switch can thus be a switch designed for alternating current. This reduces the cost of manufacture.

Such a current-breaking device will, for example, be able to be dimensioned for DC voltages at least equal to 10 kV, even at least equal to 50 kV, typically at least equal to 100 kV, and potentially at least equal to 300 kV. Such a current-breaking device will also be able to be dimensioned for direct current at least equal to 1 kA, and even at least equal to 2 kA.

BRIEF DESCRIPTION OF THE DRAWINGS

Other features and advantages of the invention will emerge clearly from the description which is given thereof hereinbelow in an indicative and nonlimiting manner, with reference to the attached drawings, in which.

DETAILED DESCRIPTION

Figure 1:
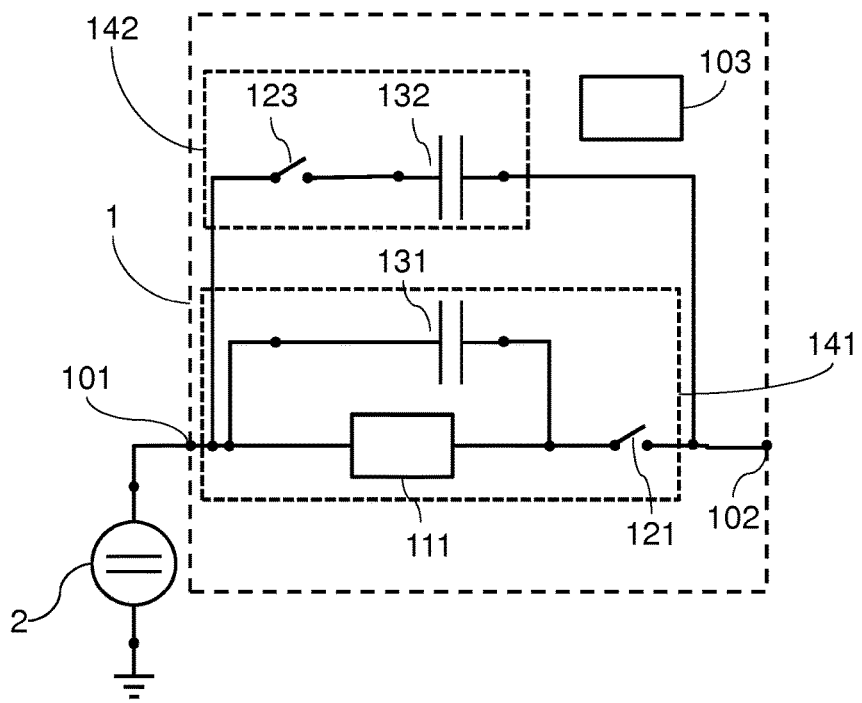
FIG. 1 illustrates a first embodiment of a breaking device.

FIG. 1 is a schematic representation of a first embodiment of a current-breaking device 1 having an input terminal 101 that connects to a DC voltage source 2 and an output terminal 102, intended to supply, for example, an electrical load or an electrical network.

The current-breaking device 1 comprises a main conduction-line 141 and a secondary conduction-line 142 connected in parallel between the input terminal 101 and the output terminal 102. The main conduction-line 141 is intended to be passed through by the rated current supplied by the voltage source 2.

The main conduction-line 141 comprises a circuit having a current limiter 111 and a first capacitor 131 connected in parallel. A first controlled-switch 121 is connected in series with this circuit between the input terminal 101 and the output terminal 102. The current limiter 111 is configured to maintain the current passing through it at a level less than or equal to a limiting current. The limiting current of the current limiter 111 is, for example, at least equal to twice the rated current of the current-breaking device 1.

Upon an overcurrent, for example due to a short circuit between the output terminal 102 and ground, the profile of the current passing through a current limiter typically and transiently comprises a ramp rising to a peak and in particular crosses an activation value of the current limiter 111. The current limiter 111 is implemented such that the amplitude of the peak is at most equal to six times the rated current. The current then drops back very rapidly to the limiting current at which the current limiter 111 is maintained. In order to avoid excessive overheating of the current limiter 111, the current-breaking device 1 breaks the current passing through the current limiter 111 in a short time.

The secondary conduction-line 142 comprises a second controlled-switch 123 that is connected in series with a capacitor 132. The first and second controlled-switches 121, 123 are dimensioned to be able to withstand the currents and potential differences to which they are intended to be subjected.

The current-breaking device 1 further comprises a control circuit 103. The control circuit 103 applies control signals to the first and second controlled-switches 121, 123 in order to selectively open and close them. The control circuit 103 also detects an overcurrent. The control circuit 103 can, for this purpose, receive a measurement of the current passing through the current limiter 111, for example sent by a current probe, or receive a measurement of the potential difference at the terminals of the current limiter 111 or of the first capacitor 131, for example sent by a voltmeter. The detection of the overcurrent can be performed by the current limiter 111 itself. Thus, if the crossing of a current threshold or potential difference threshold is detected by the control circuit 103, the latter can switch over from a first mode of operation and in which the current-breaking device 1 must conduct a rated current between the input terminal 101 and the output terminal 102, to a second mode of operation in which the current-breaking device 1 must break the current between the input terminal 101 and the output terminal 102.

In the first mode of operation, the control circuit 103 keeps the second controlled-switch 123 open and the first controlled-switch 121 closed. This avoids conduction in the secondary conduction-line 142 and guarantees conduction in the main conduction-line 141 through the current limiter 111.

In the second mode of operation, the control circuit 103 generates an opening command for the first controlled-switch 121 and a closing command for the second controlled-switch 123. Advantageously, the control circuit 103 first detects the occurrence of an overcurrent upon the crossing of the activation current. It then generates the opening command for the first controlled-switch 121 only after a waiting time. The activation current will, for example, be able to be at least equal to four times the rated current in order to limit untimely openings of the first controlled-switch 121.

The waiting time makes it possible to guarantee that the current limiter 111 will have reached a limiting current maintaining phase. In this maintaining phase, the potential difference at the terminals of the current limiter 111 has made it possible to charge the first capacitor 131. The waiting time between the detection of the overcurrent and the generation of the opening command for the first controlled-switch 121 is, for example, at least equal to five milliseconds, and even at least equal to ten milliseconds. In order not to maintain the current limiter 111 for an excessive time at its limiting current, the waiting time between the detection of the overcurrent and the generation of the opening command for the first controlled-switch 121 is, for example, at most equal to fifty milliseconds, even at most equal to thirty milliseconds.

In the second mode of operation, the control circuit 103 advantageously generates the closing command for the second controlled-switch 123 after having generated the opening command for the first controlled-switch 121. This offset of the generation of the closing command for the second controlled-switch 123 makes it possible to guarantee that the formation of an oscillating circuit inducing a zero crossing of the current through the first controlled-switch 121 correctly happens while the opening command for the first controlled-switch 121 is being applied. It also ensures correct initiation of the opening by separation of the contacts of the first controlled-switch 121. This oscillating circuit is formed via the first and second capacitors 131, 132 and the wiring inductances of the primary and secondary conduction-lines.

This waiting time also makes it possible to take account the offset between the application of the opening command to the first controlled-switch 121 and the effect of this command when the first controlled-switch 121 is a mechanical switch. The offset between the opening command for the first controlled-switch 121 and the closing command for the second controlled-switch 123 is for example at least equal to 500 μs. In order to limit to the maximum the operating time of the current limiter 111 at its limiting current, and in order to limit the time of presence of an arc in the first controlled-switch 121 after the application of an opening command, this offset between the commands is advantageously at most equal to five milliseconds, and preferably at most equal to three milliseconds.

The reduction of the operating time of the current limiter 111 at its limiting current during the second mode of operation will also be able to facilitate a subsequent phase of switchover to the first mode of operation by a new closing of the first controlled-switch 121. A current limiter of the superconducting type will take time before being once again placed in service that is all the greater when it has been heated for a long time in current limiting mode.

Moreover, the capacitor 132 makes it possible to break the direct current in the secondary conduction-line when the opening of the first controlled-switch 121 and the quenching of any arc has been obtained.

The current limiter 111 is advantageously of the SCFCL type. Thus, in the first mode of operation, the current limiter 111 has a zero potential difference between its terminals and therefore makes it possible to limit the losses induced by the current-current-breaking device 1.

The current limiter 111 can, in particular, be of the superconducting resistor type. Such a current limiter 111 is typically designed to exhibit a resistance between its terminals if its temperature increases because of an occurrence of an overcurrent, in order to limit the amplitude of the short-circuit overcurrent. Such a current limiter 111 comprises, for example a bar of superconducting material passed through by the rated current between the input terminal 101 and the output terminal 102. The bar of superconducting material is immersed in a liquid nitrogen bath in order to keep it below its critical temperature during the first mode of operation. The current limiter 111 can comprise an inductive component.

In some embodiments, the current limiter 111 includes IGBTs.

The first controlled-switch 121 is advantageously an electromechanical switch, notably because of the low in-line losses that it is capable of generating.

Figure 2:
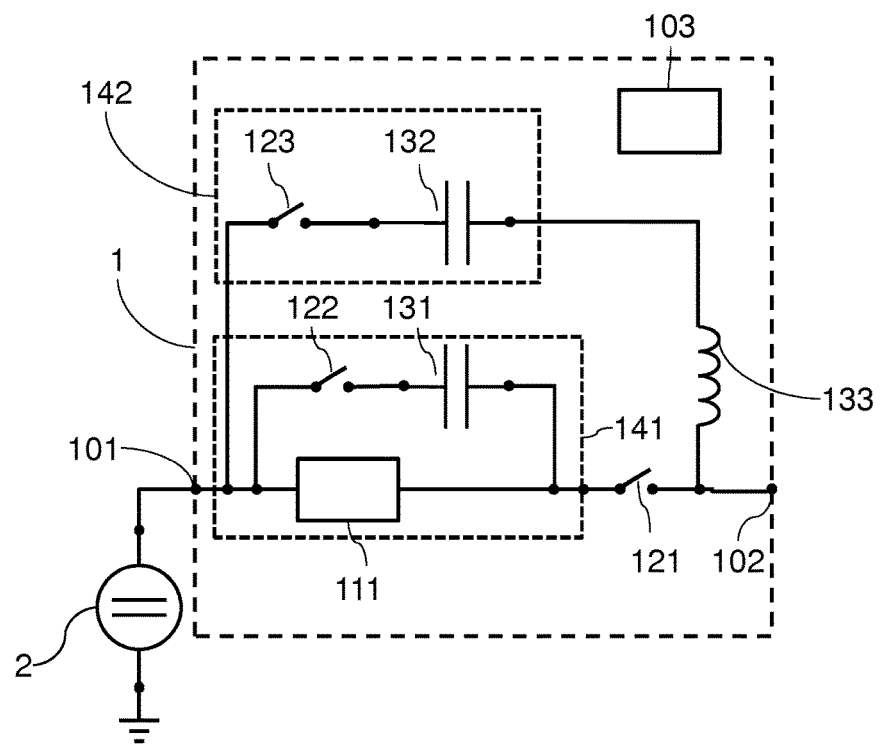
FIG. 2 illustrates a second embodiment of a breaking device.

FIG. 2 illustrates a second embodiment of a current-breaking device 1. In this embodiment, the secondary conduction-line includes an inductor 133 connected in series with the second controlled-switch 123.

Independently of the inductor 133, the current-breaking device 1 comprises a third controlled-switch 122 connected in series with the first capacitor 131. The third controlled-switch 12 is kept closed in the first and second modes of operation.

The structure of the other components of the current-breaking device 1 of FIG. 2 is identical to that of the current-breaking device of FIG. 1.

The inductor 133 makes it possible to accurately define the resonance frequency of the oscillating circuit formed upon the closure of the second controlled-switch 123. In effect, the inductance value of this inductor 133 will then be predominant in relation to the stray inductances in the oscillating circuit for the determination of the resonance frequency of the oscillating circuit.

The determination of the characteristics of the first capacitor 131, of the second capacitor 132, and, in this particular case, of the inductor 133, will be able to be performed as follows.

First of all, the value fr of the resonance frequency that is desired for the oscillating circuit is set, as is the value Io of the minimum amplitude of an oscillation upon the closure of the second controlled-switch 123. Io must observe the condition Io>Inl, with Inl the limiting current of the current limiter 111. Inl is, for example, equal to twice the rated current of the current-breaking device 1.

For the example of FIG. 2, the following equations are obtained:

$$fr = \frac{1}{2\pi\sqrt{L*Ceq}}$$

$$Io = Vnl*\sqrt{Ceq/L}$$

$$\frac{1}{Ceq} = \frac{1}{C131} + \frac{1}{C132}$$

With Vnl being the potential difference between the terminals of the current limiter 111 when it maintains its limiting current Inl, Ceq being the equivalent capacitance of the first and second capacitors 131, 132 in series in the oscillating circuit formed, C131 being the capacitance of the first capacitor 131, C132 being the capacitance of the second capacitor 132, and L being the inductance of the inductor 133.

Other dimensioning criteria can be taken into account, for example to limit the quantity of energy stored in the first capacitor 131 upon the occurrence of an overcurrent.

Figure 4:
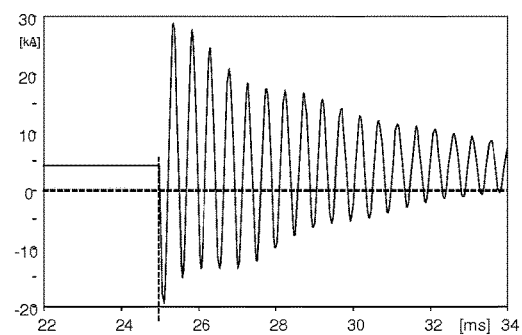
FIG. 4 is a diagram illustrating the current passing through a switch of a main conduction-line in the absence of opening of the switch.
Figure 5:
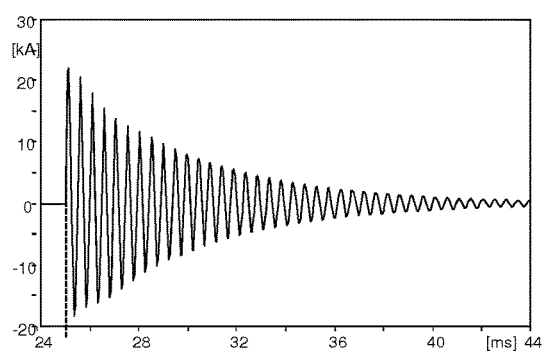
FIG. 5 is a diagram illustrating the current passing through a switch of a secondary conduction-line in the absence of opening of the switch of the main conduction-line.

FIGS. 4 and 5 are simulation diagrams of a current-breaking device 1 according to FIG. 2. These diagrams make it possible to illustrate the operation of the current-breaking device 1, upon the occurrence of an overcurrent. FIG. 4 illustrates the current passing through the first controlled-switch 121. FIG. 5 illustrates the current passing through the second capacitor 132.

It is assumed that an overcurrent occurs at the instant t=0 and that the current limiter 111 rapidly stabilizes at its limiting current. The first capacitor 131 is then charged. The control circuit 103 generates a closing command and the second controlled-switch 123 closes at the instant t=25 milliseconds. Then, the main conduction-line 141 and the secondary conduction-line 142 form the oscillating circuit. To better illustrate the operation of the oscillating circuit formed upon the closing of the second controlled-switch 123, the simulation is illustrated without opening of the first controlled-switch 121.

As illustrated in FIG. 5, from t=25 milliseconds, the first capacitor 131 is discharged into the oscillating circuit, which induces current oscillations in the oscillating circuit. The oscillating circuit is dimensioned for at least one oscillation to exhibit an amplitude at least equal to the current limiting current of the current limiter 111. Thus, as illustrated in FIG. 4, the current passing through the first controlled-switch 121 passes through a zero value on at least one oscillation. Thus, if the control circuit 103 applies an opening command for the first controlled-switch 121, when this current takes a zero value, any electrical arc present during the initial separation of the contacts of this switch is cut off. Thus, the first controlled-switch 121 can be a standard switch for breaking the alternating current with a relatively low breaking capacity.

The resonance frequency of the oscillating circuit formed is advantageously less than or equal to 5 kHz. Thus, when I is the value of current passing through the first controlled-switch 121, the value dI/dt, which is typically less than 500 A/μs, is low enough to facilitate the effective opening of the first controlled-switch 121 when its opening command is maintained. Advantageously, the resonance frequency of the oscillating circuit formed is advantageously greater than or equal to 500 Hz to obtain a rapid effective opening of the first controlled-switch 121 or to generate several zero crossings of the current through the first controlled-switch 121 if the latter is not opened immediately. An example of dimensioning of the oscillating circuit is detailed hereinbelow with reference to the embodiments of FIG. 2.

Figure 6:
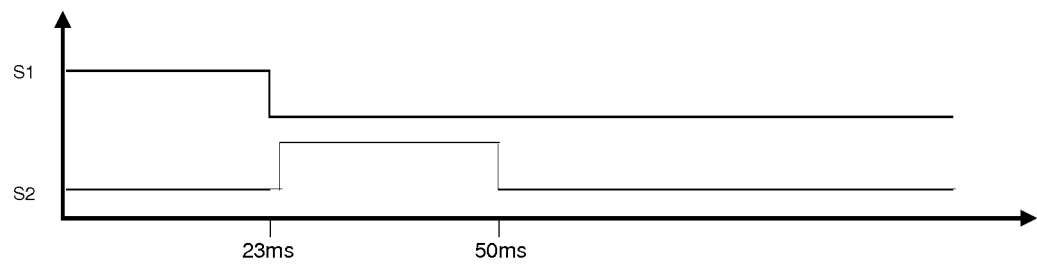
FIG. 6 illustrates the state of a switch of the main line and of a switch of the secondary line upon a detection of an overcurrent.

FIG. 6 illustrates an example of a timing diagram of the opening and closing states of the switches 121 and 123 upon the occurrence of an overcurrent. The instant t=0 corresponds to the occurrence of the overcurrent. The control circuit 103 commands the opening of the first controlled-switch 121 at the instant t=23 milliseconds and commands the closing of the second controlled-switch 123 at the instant t=25 milliseconds.

Although not illustrated, the control circuit 103 can then apply an opening command to the second controlled-switch 123. This opening command is, for example, performed after sufficient time for the first controlled-switch 121 to be able to be opened and for the current passing through the output terminal 102 to be zero. This opening command will, for example, be able to be offset by a duration at least equal to 5 milliseconds relative to the closing command for this same second controlled-switch 123, this offset being, for example, 25 milliseconds. The opening of the second controlled-switch 123 will make it possible to once again form the oscillating circuit after conduction of the current-breaking device 1 is resumed.

Figure 7:
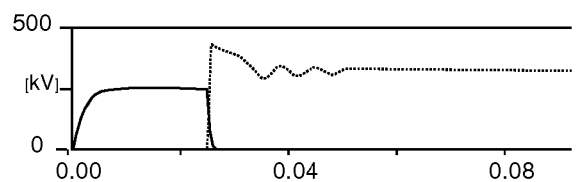
FIG. 7 illustrates the respective potential differences at the terminals of two capacitors upon detection of an overcurrent.
Figure 8:
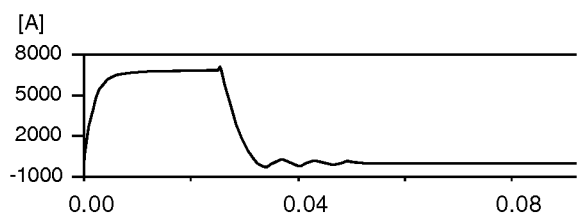
FIG. 8 illustrates a simulation of current at the output of the breaking device.
Figure 9:
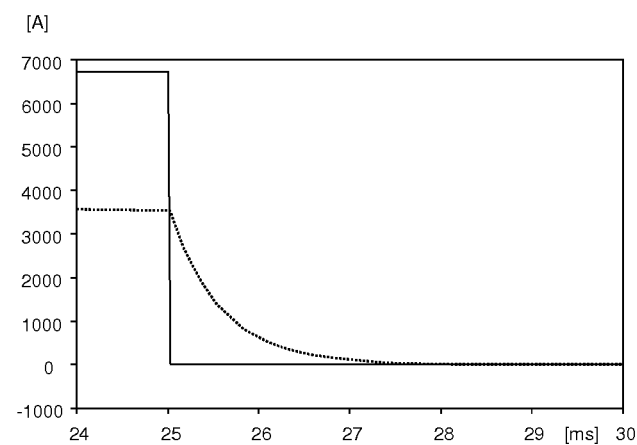
FIG. 9 illustrates currents passing respectively through the switch of the main conduction-line and a current limiter upon the detection of an overcurrent.

FIG. 7 is a diagram of a simulation of respective potential differences at the terminals of the first capacitor 131 (solid line curve) and at the terminals of the second capacitor 132 (dotted line curve). FIG. 8 is a diagram of a simulation of the current at the output terminal 102. FIG. 9 illustrates, respectively, the current through the first controlled-switch 121 (solid line) and the current through the current limiter 111 (dotted line).

Upon the occurrence of the overcurrent, the potential difference at the terminals of the first capacitor 131 follows a ramp before reaching the value Vnl. Upon the closing of the second controlled-switch 123, the oscillations induced in the oscillating circuit make it possible to open the first controlled-switch 121 at zero current. Consequently, the potential difference at the terminals of the current limiter 111 drops, and the current at the output terminal 102 also rapidly becomes zero, the second capacitor 132 blocking the direct current in the secondary conduction-line.

Figure 3:
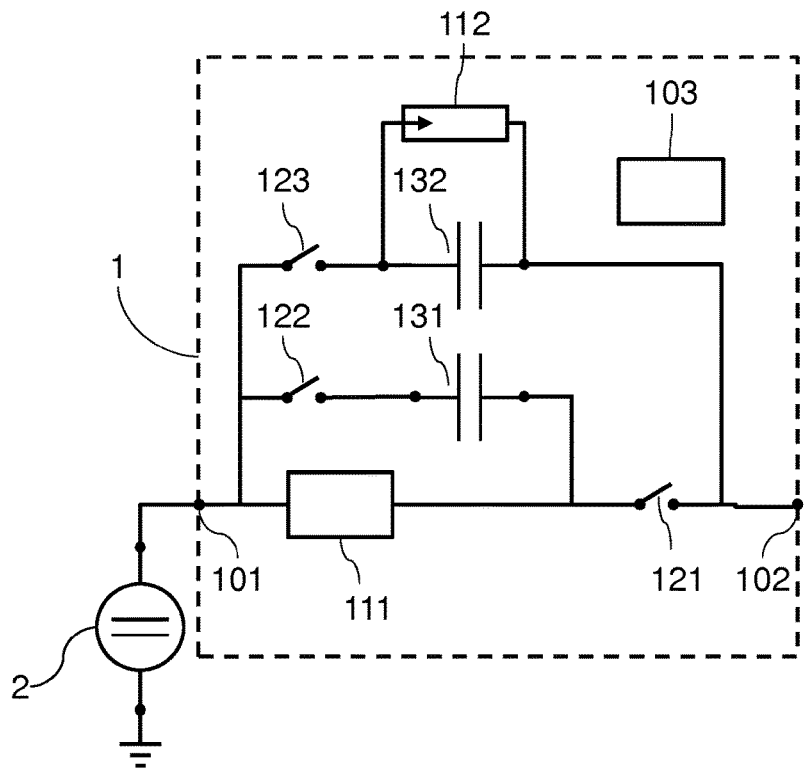
FIG. 3 illustrates a third embodiment of a breaking device.

FIG. 3 illustrates a third embodiment of a current-breaking device 1. In this embodiment, the secondary conduction-line includes an overvoltage arrester 112 connected in parallel to the second capacitor 132. Independently of the overvoltage arrester 112, the current-breaking device 1 comprises a third controlled-switch 12 connected in series with the first capacitor 131. The structure of the other components of the current-breaking device 1 of FIG. 3 is otherwise identical to that of the current-breaking device of FIG. 1.

The overvoltage arrester 112 makes it possible to limit the potential difference at the terminals of the second capacitor 132 and makes it possible to absorb the inductive energy stored in the electrical line connected to the output terminal 102.

Figure 10:
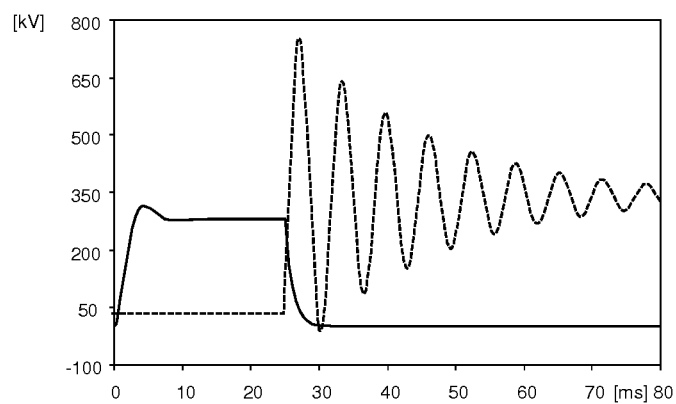
FIG. 10 illustrates the potential differences at the terminals respectively of two capacitors upon the detection of the overcurrent.

FIG. 10 illustrates the respective potential differences at the terminals of the capacitors 131 (solid line) and 132 (dotted line) in the absence of overvoltage arrester 112.

Figure 11:
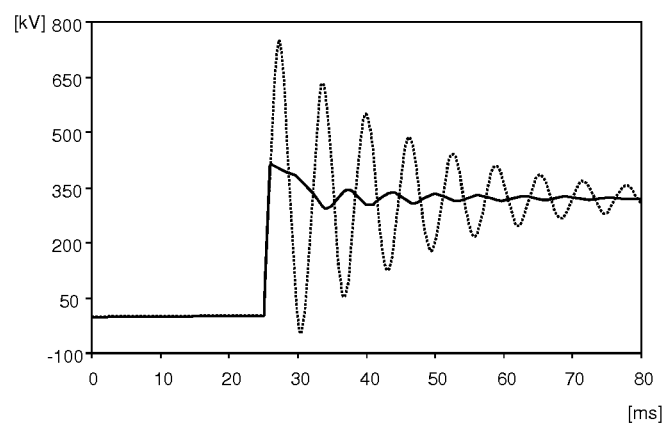
FIG. 11 illustrates the potential difference at the terminals of the capacitor of the secondary line as a function of the presence of a lightning arrester.

FIG. 11 illustrates the respective potential differences at the terminals of the second capacitor 132 in the presence of an overvoltage arrester 112 (solid line) and in the absence of this overvoltage arrester (dotted line).

Figure 12:
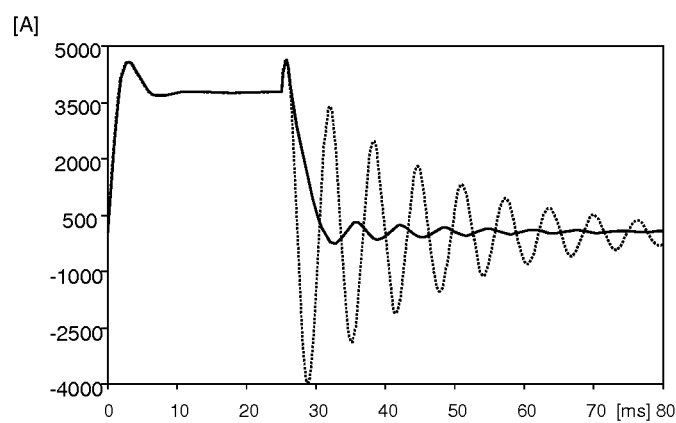
FIG. 12 illustrates the line current as a function of the presence of a lightning arrester.

FIG. 12 illustrates the current at the output terminal 102 in the presence of an overvoltage arrester (solid line) and in the absence of this overvoltage arrester (dotted line).

Figure 13:
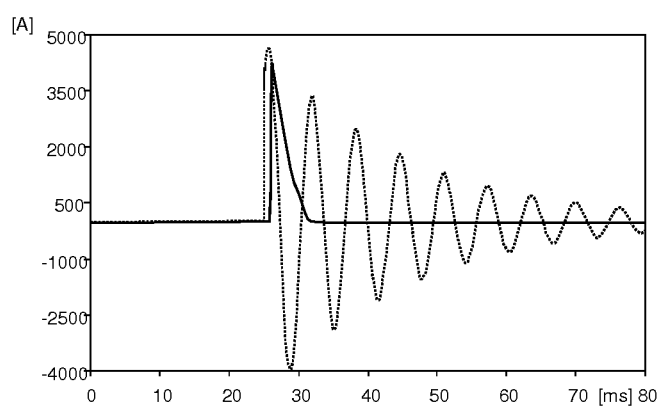
FIG. 13 illustrates the current passing through the capacitor of the secondary line as a function of the presence of a lightning arrester.

FIG. 13 illustrates the current passing through the second capacitor 132 in the presence of an overvoltage arrester 112 (solid line) and in the absence of this overvoltage arrester (dotted line).

Figure 14:
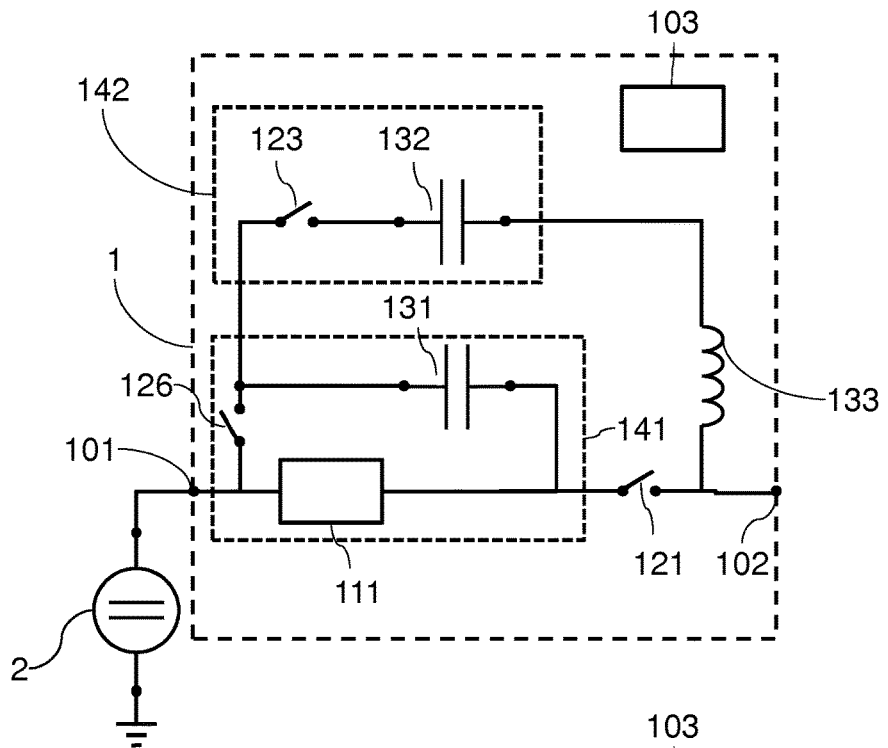
FIG. 14 illustrates a fourth embodiment of a breaking device.

FIG. 14 illustrates a fourth embodiment of a current-breaking device 1. This embodiment differs structurally from the second embodiment by the elimination of the third controlled-switch 122 in series with the first capacitor 131 and by the inclusion of a fourth controlled-switch 126 connected between the input terminal 101 and a connection node between the secondary conduction-line and the first capacitor 131. The oscillating circuit includes the first capacitor 131 the second capacitor 132, and the inductor 133.

The control logic of the controlled switches is identical to that of the second embodiment. The fourth controlled-switch 126 is kept closed in the first and second modes of operation.

Figure 15:
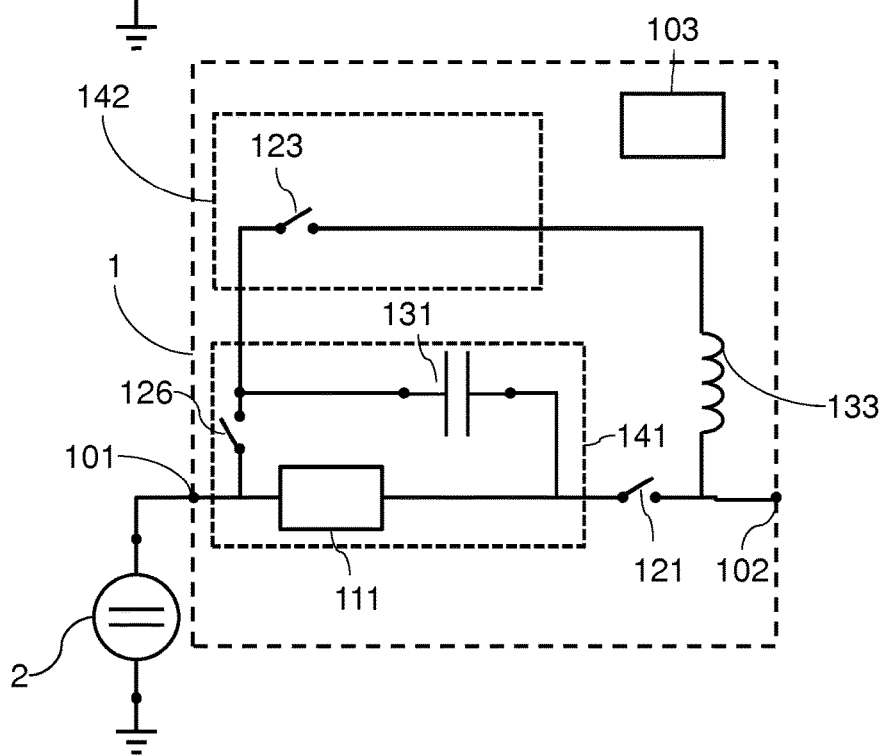
FIG. 15 illustrates a fifth embodiment of a breaking device.

FIG. 15 illustrates a fifth embodiment of a current-breaking device. This embodiment differs structurally from the fourth embodiment by a direct connection between the second controlled-switch 123 and the inductor 133 replacing the second capacitor 132. The oscillating circuit includes the first capacitor 131 and the inductor 133.

The control logic of the controlled switches is identical to that of the second embodiment. The fourth controlled-switch 126 is kept closed in the first mode of operation. An opening command for the fourth controlled-switch 126 is applied in the second mode of operation. The opened fourth controlled-switch 126 makes it possible to break the direct current in the secondary conduction branch. The opening command for the fourth controlled-switch 126 can precede the closing command for the second controlled-switch 123.

Most overcurrents are transient and are not linked to a permanent short circuit. Consequently, the current-breaking device 1 is advantageously configured to implement a cycle of the OFO type, opening of the first controlled-switch 121 in the second mode of operation being followed by a discharging of the second capacitor 132 and an attempt to close the first controlled-switch 121 to determine whether the fault is persistent, then a new opening of the first controlled-switch 121 if it has been determined that the fault is effectively persistent.

In the various embodiments, it is possible to connect another current limiter (not illustrated) in series between the input terminal 101 and the output terminal 102. Such a current limiter will be able to be of inductive type and will make it possible to modify the dimensioning of the various switches of the current-breaking device 1. Such a current limiter proves particularly advantageous in combination with the fifth embodiment.

In the different embodiments, it is possible to include an overvoltage arrester in parallel to the terminals of the first controlled-switch 121.

Having described the invention, and a preferred embodiment thereof, what is claimed as new, and secured by letters patent is:

1. An apparatus comprising a current-breaking device for high-voltage direct current, wherein said current-breaking device comprises first and second terminals, a main conduction-line, a secondary conduction-line, an oscillating circuit, and a control circuit, wherein said main conduction-line and said secondary conduction-line are connected in parallel between said first and second terminals, wherein said main conduction-line comprises a first controlled-switch and a circuit connected in series with said first controlled-switch, wherein said circuit comprises a first current-limiter and a first capacitor connected in parallel, wherein said current limiter is configured such that current passing through said current limiter is maintained at a level that is less than or equal to a limiting current, wherein said secondary conduction-line comprises a second controlled-switch, wherein said main conduction-line and said secondary conduction-line cooperate to form said oscillating circuit at said terminals of said first controlled-switch when said first and second controlled-switches are closed, wherein said oscillating circuit oscillates with an oscillation amplitude that is at least equal to said limiting current of said current limiter when said limiting current is passing through said current limiter circuit, wherein said control circuit operates in a first mode and in a second mode, wherein, in said first mode, said control circuit is configured to close said first controlled-switch closed and to open said second controlled-switch, and wherein, in said second mode, said control circuit is configured to open said first controlled-switch and to close said second controlled-switch.

2. The apparatus as claimed in claim 1, wherein said current limiter comprises a superconducting resistor.

3. The apparatus of claim 1, wherein said secondary conduction-line comprises a second capacitor connected in series with said second controlled-switch.

4. The apparatus of claim 1, wherein said oscillating circuit resonates at a resonant frequency that is less than or equal to five kilohertz.

5. The apparatus of claim 1, wherein, in operation, current drift in said oscillating circuit relative to time is no greater than five-hundred amperes per microsecond.

6. The apparatus of claim 1, wherein said oscillating circuit resonates at a resonant frequency that is no less than five-hundred Hertz.

7. The apparatus of claim 1, wherein said secondary conduction-line comprises an inductor connected in series with said second controlled-switch.

8. The apparatus of claim 1, wherein said control circuit is configured to detect an overcurrent in said first mode of operation.

9. The apparatus of claim 1, wherein said control circuit is configured to respond to detection of an overcurrent by generating an opening signal for said first controlled-switch, wherein a delay between detection of said overcurrent and generating said opening signal is at most fifty milliseconds.

10. The apparatus of claim 1, wherein, in said second mode of operation, said control circuit is configured to generate an opening signal for said first controlled-switch and to generate a closing signal for said second controlled-switch at least five-hundred microseconds after having generated said opening signal.

11. The apparatus of claim 1, further comprising an overvoltage arrestor, wherein said overvoltage arrestor and said second capacitor are connected in parallel.

12. The apparatus of claim 1, wherein said current-breaking device is dimensioned to apply a potential difference that is at least equal to ten kilovolts between said first and second terminals and to support a current that is at least equal to one kiloamp through said first and second terminals.

* * * * *